United States Patent [19]
Fujimoto et al.

[11] Patent Number: 5,212,947
[45] Date of Patent: May 25, 1993

[54] FAILURE-DETECTING DEVICE FOR AIR-FUEL RATIO SENSORS OF INTERNAL COMBUSTION ENGINES

[75] Inventors: Sachito Fujimoto; Kojiro Tsutsumi, both of Wako, Japan

[73] Assignee: Honda Giken Kogyo Kabushiki Kaisha, Tokyo, Japan

[21] Appl. No.: 847,515

[22] Filed: Mar. 6, 1992

[30] Foreign Application Priority Data

Mar. 8, 1991 [JP] Japan .................. 3-020678

[51] Int. Cl.$^5$ ............................................. F01N 3/20
[52] U.S. Cl. .................................. 60/276; 60/277; 123/688; 73/118.1
[58] Field of Search ............... 60/276, 277; 123/688; 73/118.1

[56] References Cited

U.S. PATENT DOCUMENTS

| | | | |
|---|---|---|---|
| 4,024,706 | 5/1977 | Adawi | 60/299 |
| 4,724,814 | 2/1988 | Mieno | 123/688 |
| 4,739,614 | 4/1988 | Katsuno | 123/688 |
| 4,844,038 | 7/1989 | Yamato | 123/688 |

FOREIGN PATENT DOCUMENTS 2-11840  1/1990  Japan .

*Primary Examiner*—Douglas Hart
*Attorney, Agent, or Firm*—Nikaido, Marmelstein, Murray & Oram

[57] ABSTRACT

A failure-detecting device detects failure of an air-fuel ratio sensor arranged downstream of a three-way catalyst in an exhaust passage of an internal combustion engine. The air-fuel ratio of an air-fuel mixture supplied to the engine is perturbed with a predetermined repetition period and by a predetermined amplitude. There is detected an amount of change in an output from the air-fuel ratio sensor responsive to the perturbed air-fuel ratio. Failure of the air-fuel ratio sensor is detected based on the amount of change in the output from the air-fuel ratio sensor.

9 Claims, 6 Drawing Sheets

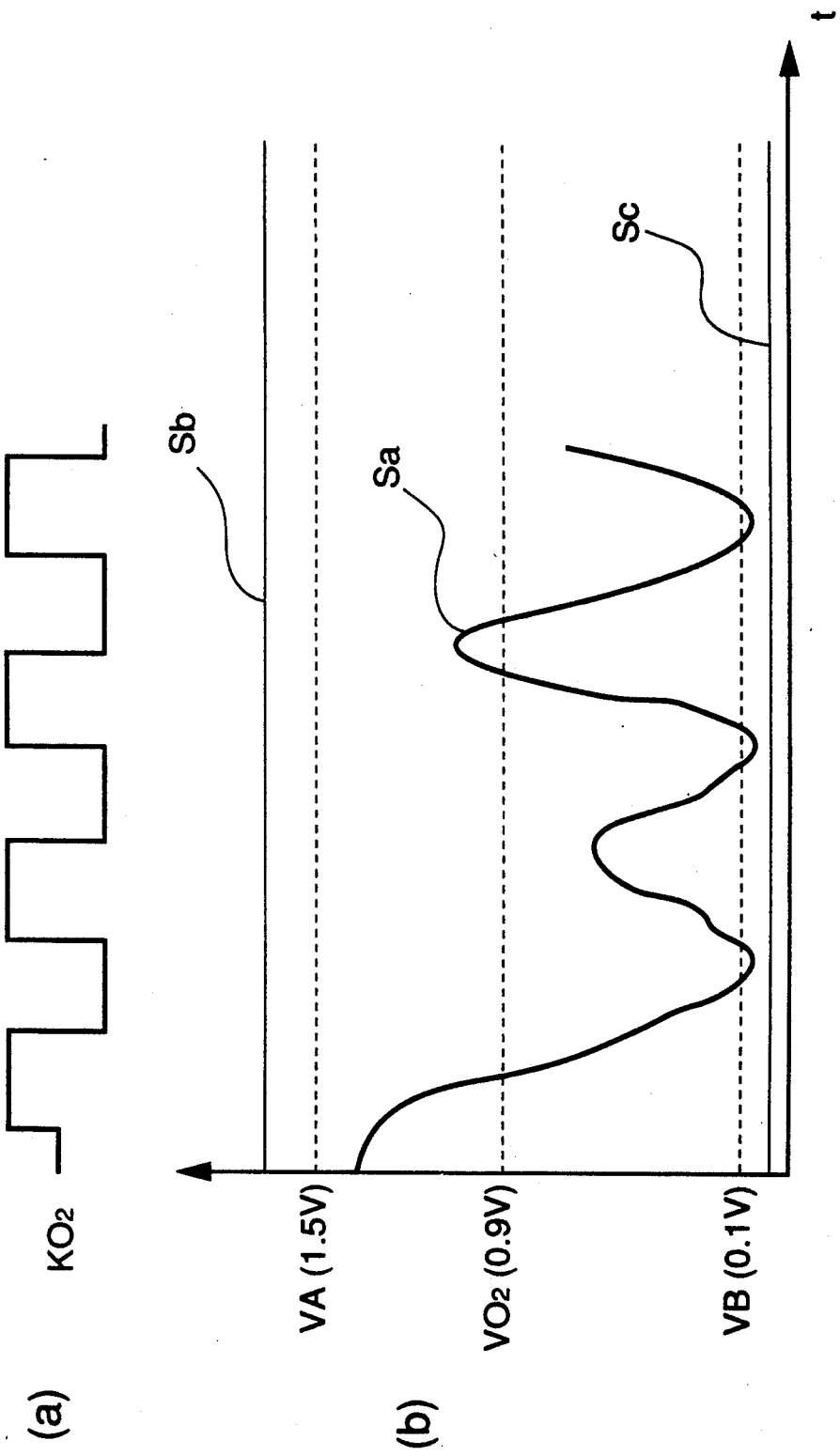

sors of internal combustion engines at loca-
tions downstream of three-way catalysts.

FAILURE-DETECTING DEVICE FOR AIR-FUEL RATIO SENSORS OF INTERNAL COMBUSTION ENGINES

BACKGROUND OF THE INVENTION

1. Field of the Invention

This invention relates to a failure-detecting device for air-fuel ratio sensors (e.g. $O_2$ sensors) provided in the exhaust passages of internal combustion engines at locations downstream of three-way catalysts.

2. Prior Art

A method of detecting deterioration/failure of air-fuel ratio sensors for internal combustion engines has been proposed e.g. by Japanese Provisional Patent Publication (Kokai) No. 2-11840, in which a correction amount, which corrects the fuel injection amounts of fuel injection valves, is controlled by using a forced duty ratio waveform signal having a constant repetition period T and a constant amplitude A as shown at (a) of FIG. 1, when the engine is in a steady operating condition, such that the air-fuel ratio of an air-fuel mixture in the intake passage of the engine is forcedly perturbed, and the duty ratio of an output from an $O_2$ sensor provided upstream of a three-way catalyst in the exhaust passage, which depends on the perturbed air-fuel ratio, is detected, to thereby detect a degree of deterioration of the $O_2$ sensor based on the detected duty ratio. Examples of results of detection of the $O_2$ sensor output duty ratio are shown at (b), (c), and (d) of FIG. 1. (b) of the figure shows a case in which the $O_2$ sensor output is deviated toward the richer side due to deterioration of the sensor, (c) a case in which the $O_2$ sensor output is normal, and (d) a case in which the $O_2$ sensor output is deviated toward the leaner side due to deterioration of the sensor. In (b), (c), and (d) of the figure, VOX designates output voltage of the $O_2$ sensor, VR reference voltage (e.g. 0.45 V), TR and TL periods over which the output voltage VOX is higher than the reference voltage VR (i.e. the air-fuel ratio is on the rich side) and lower than same (i.e. the air-fuel ratio is on the lean side), respectively. When the duty ratio (TR/(TR+TL)) of the output voltage VOX is within a normal range as shown in (c) of FIG. 1, it is judged that the $O_2$ sensor is normal, whereas when the output of the $O_2$ sensor is deviated toward the richer side or the leaner side so that the duty ratio is excessively high or low, it is judged that the $O_2$ sensor is deteriorated or faulty.

According to the above method of detecting deterioration/failure of the $O_2$ sensor, the deterioration/failure of the $O_2$ sensor is determined based on the duty ratio of output voltage from the $O_2$ sensor, i.e. the ratio of a time period over which the sensor output falls in the richer side to the repetition period. However, in the case where the $O_2$ sensor is provided downstream of the three-way catalyst, the output of the $O_2$ sensor does not vary to a large degree due to oxygen storage effect of the three-way catalyst (e.g. it does not vary in such a large range as from 0.1 V to 0.9 V, for example), so that the deterioration/failure of the $O_2$ sensor cannot be determined correctly by the above method based on the duty ratio of the $O_2$ sensor output.

SUMMARY OF THE INVENTION

It is the object of the invention to provide a failure-detecting device for an air-fuel ratio sensor of an internal combustion engine, which is capable of accurately detecting failure of the air-fuel ratio sensor even if it is provided downstream of a three-way catalyst.

To attain the above object, the present invention provides a failure-detecting device for an air-fuel ratio sensor of an internal combustion engine including an exhaust passage, and a three-way catalyst arranged in the exhaust passage, the air-fuel ratio sensor being arranged downstream of the three-way catalyst in the exhaust passage.

The failure-detecting device for an air-fuel ratio sensor according to the invention is characterized by comprising:

air-fuel ratio-perturbing means for changing the air-fuel ratio of an air-fuel mixture supplied to the engine with a predetermined repetition period and by a predetermined amplitude;

air-fuel ratio variation-detecting means for detecting an amount of change in an output from the air-fuel ratio sensor responsive to the air-fuel ratio of the air-fuel mixture perturbed by the air-fuel ratio-perturbing means; and failure-detecting means for detecting failure of the air-fuel ratio sensor based on the amount of change in the output from the air-fuel ratio sensor detected by the air-fuel ratio variation-detecting means.

More specifically, the air-fuel ratio variation-detecting means detects the amount of change in the output from the air-fuel ratio sensor occurring within a predetermined time period.

Preferably, the failure-detecting means determines that there is a possibility that there is failure in the air-fuel ratio sensor when the detected amount of change in the output from the air-fuel ratio sensor is equal to or smaller than a predetermined value.

More preferably, the failure-detecting means includes sensor output-determining means for determining whether or not the output from the air-fuel ratio sensor falls within a predetermined range defined by predetermined upper and lower limit values, the failure-detecting means determining that there is failure in the air-fuel ratio sensor when the detected amount of change in the output from the air-fuel ratio sensor is equal to or smaller than the predetermined value and at the same time the output from the air-fuel ratio sensor falls outside the predetermined range.

On one hand, the failure-detecting means determines that there is a disconnection in the air-fuel ratio sensor when the output from the air-fuel ratio sensor is higher than the predetermined upper limit value.

Preferably, the failure-detecting means finally determines that there is a disconnection in the air-fuel ratio sensor when the output from the air-fuel ratio sensor has continued to be higher than the predetermined upper limit value over a predetermined time period.

On the other hand, the failure-detecting means determines that there is a short circuit in the air-fuel ratio sensor when the output from the air-fuel ratio sensor is lower than the predetermined lower limit value.

Preferably, the failure-detecting means finally determines that there is a short-circuit in the air-fuel ratio sensor when the output from the air-fuel ratio sensor has continued to be lower than the predetermined lower limit value over a predetermined time period.

Preferably, the air-fuel ratio perturbing means changes a value of an air-fuel ratio correction value for correcting an amount of fuel supplied to the engine.

The above and other objects, features, and advantages of the invention will become more apparent from the ensuing detailed description taken in conjunction with the accompanying drawings.

BRIEF DESCRIPTION OF THE DRAWINGS

FIG. 5 is a timing chart showing, by way of example, the relationship between an air-fuel ratio correction coefficient $KO_2$ and output voltage from the $O_2$ sensor resulting from perturbation of an air-fuel ratio of the air-fuel mixture.

DETAILED DESCRIPTION

The invention will now be described in detail with reference to drawings showing an embodiment thereof.

Figure 1:
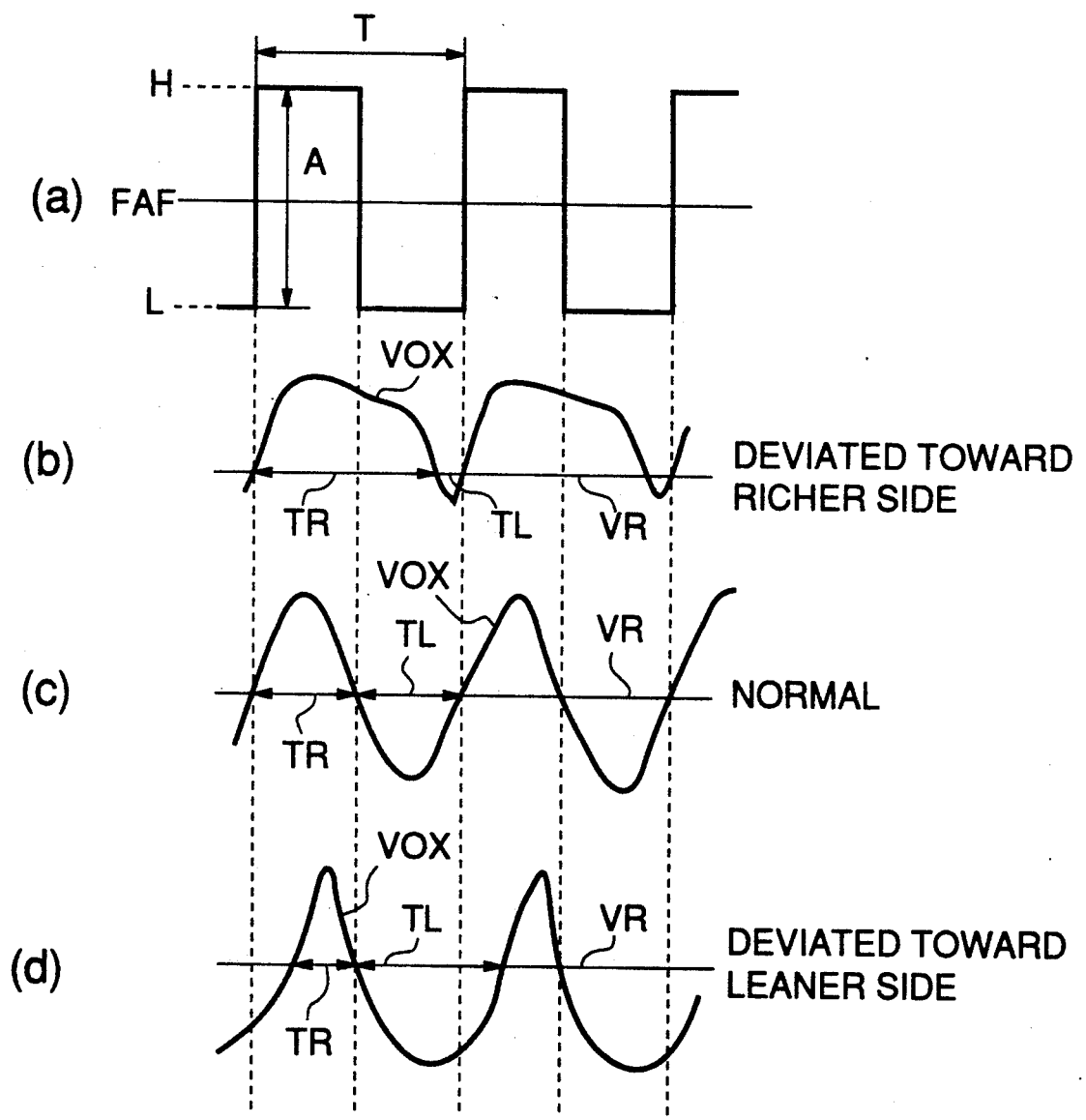
FIG. 1 is a timing chart which is useful in explaining a method of detecting deterioration/failure of an air-fuel ratio sensor according to the prior art.
Figure 2:
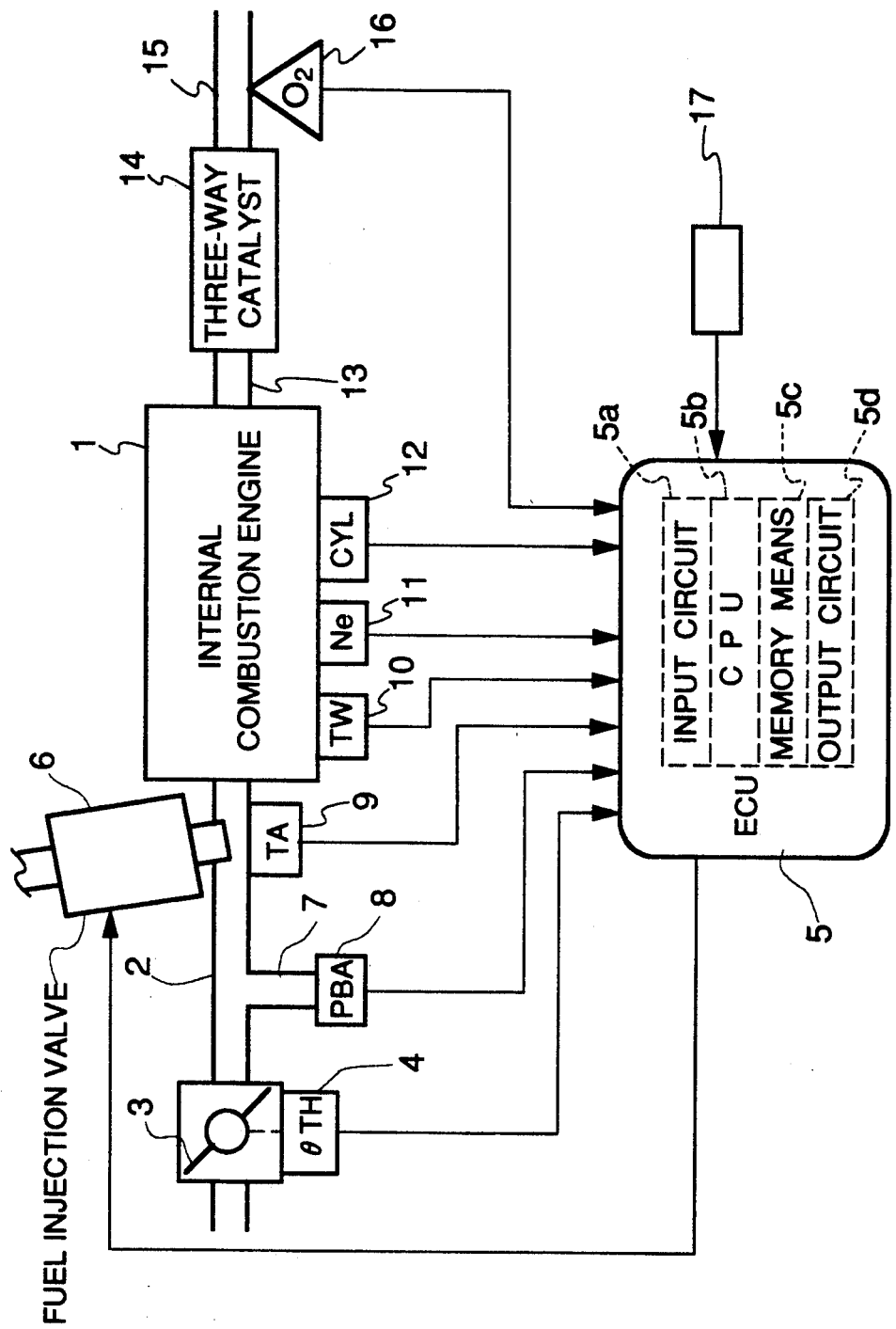
FIG. 2 is a schematic diagram showing the whole arrangement of a fuel supply system of an internal combustion engine including a failure-detecting device for an air-fuel ratio sensor according to the invention.

Referring first to FIG. 2, there is shown the whole arrangement of a fuel supply system of an internal combustion engine including a failure-detecting device according to the invention. In the figure, reference numeral 1 designates e.g. a four-cylinder type internal combustion engine which has an intake pipe 2 connected thereto. A throttle valve 3 is disposed at an intermediate portion of the intake pipe 2. Connected to the throttle valve 3 is a throttle valve opening ($\theta_{TH}$) sensor 4 which detects throttle valve opening $\theta TH$ and supplies an electrical signal depending on the throttle valve opening $\theta TH$ as a throttle valve opening signal to an electronic control unit (hereinafter referred to as the ECU) 5. The ECU 5 forms air-fuel ratio-perturbing means, air-fuel ratio variation-detecting means, and failure-detecting means.

A fuel injection valve 6 is provided for each engine cylinder and arranged at a location between the engine 1 and the throttle valve 3 slightly upstream of an intake valve, not shown, in the intake pipe 2. These fuel injection valves are connected to a fuel pump, not shown. They are electrically connected to the ECU 5, and have their opening periods, over which fuel is injected therethrough, controlled by driving signals supplied therefrom.

An intake pipe absolute pressure (PBA) sensor 8 is arranged immediately downstream of the throttle valve 3 in communication with the interior of the intake pipe 2 via a conduit 7 for detecting absolute pressure PBA within the intake pipe 2 and supplying an electrical signal indicative of the sensed absolute pressure to the ECU 5. Further, an intake temperature (TA) sensor 9 is arranged downstream of the conduct 7 for detecting intake temperature TA and supplying an electrical signal indicative of the sensed intake temperature TA to the ECU 5.

An engine coolant temperature (TW) sensor 10, which may be formed of a thermistor or the like, is mounted in the cylinder block of the engine 1 filled with engine coolant, for detecting engine coolant temperature TW and supplying an electrical signal indicative of the sensed engine coolant temperature TW to the ECU 5. An engine rotational speed sensor (hereinafter referred to as the Ne sensor) 11, and a cylinder-discriminating (CYL) sensor 12 are arranged in facing relation to a camshaft or a crankshaft of the engine 1, none of which is shown. The Ne sensor 11 generates a signal pulse at one of predetermined crank angles whenever the crankshaft of the engine 1 rotates through 180°. The cylinder-discriminating sensor 12 generates a signal pulse at a predetermined crank angle of a particular cylinder. These signal pulses are supplied to the ECU 5.

A three-way catalyst 14 is arranged within an exhaust pipe 13 of the engine 1 to purify noxious components of the exhaust gases such as HC, CO and $NO_X$. An $O_2$ sensor 16 as an exhaust gas component concentration sensor is mounted in the exhaust pipe 13 at a location downstream of the three-way catalyst 14 for sensing the oxygen concentration present in the exhaust gases, and supplying a signal indicative of detected oxygen concentration to the ECU 5.

Further connected to the ECU 5 are other engine operating condition parameter sensors, such as an atmospheric pressure sensor 17, which supplies a signal indicative of the detected atmospheric pressure to the ECU 5.

The ECU 5, which is supplied with various signals described above, computes the fuel injection period $T_{OUT}$ of the fuel injection valves 6 by the use of the following equation (I):

$$T_{OUT} = Ti \times KO_2 \times K_1 + K_2 \tag{1}$$

where Ti represents a basic value of the fuel injection period $T_{OUT}$ of the fuel injection valves 6 which is calculated in accordance with the engine rotational speed Ne detected by the Ne sensor 11 and the intake pipe absolute pressure PBA detected by the intake pipe absolute pressure sensor 8. $KO_2$ represents an air-fuel ratio correction coefficient whose value is determined in response to the oxygen concentration in the exhaust gases detected by the $O_2$ sensor 16 during feedback control, whereas it is set to an average value KREF of the air-fuel ratio correction coefficient $KO_2$ values obtained during feedback control while the engine is in open-loop control regions.

$K_1$ and $K_2$ represent other correction coefficients and correction variables respectively which are calculated by predetermined equations, based on various engine parameter signals supplied from the above described various sensors, i.e. the throttle valve opening sensor 4, intake pipe absolute pressure sensor 8, intake temperature sensor 9, engine coolant temperature sensor 10, Ne sensor 11, cylinder-discriminating sensor 12, $O_2$ sensor 16, and atmospheric pressure sensor 17, to such values as to optimize engine characteristics such as startability, exhaust emission characteristics, fuel consumption and accelerability, depending on engine operating conditions.

The ECU 5 supplies the fuel injection valves 6 with driving signals corresponding to the calculated fuel injection period $T_{OUT}$ by the use of the equation (I) as above, over which the fuel injection valves 6 are opened.

Figure 3:
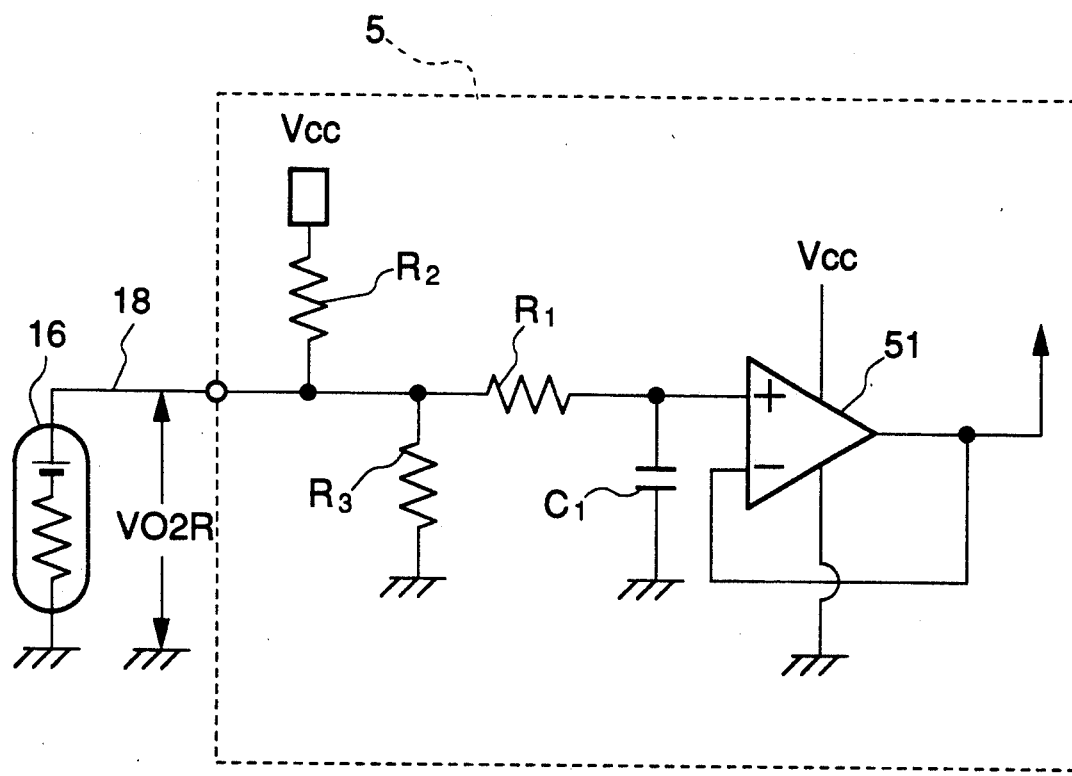
FIG. 3 is a circuit diagram showing a circuit arrangement of an $O_2$ sensor and an $O_2$ sensor input circuitry within an ECU (electronic control unit)
Figure 4A:
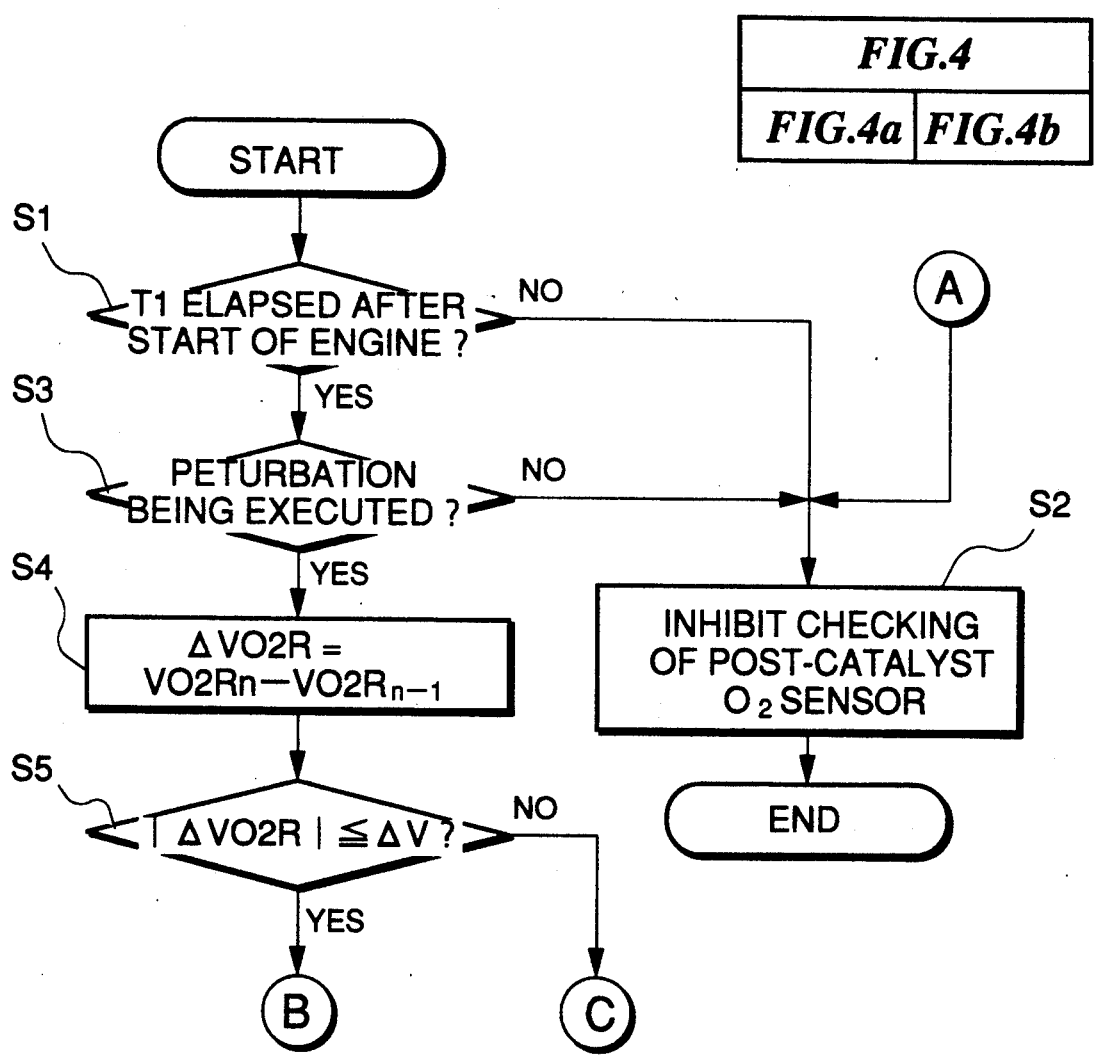
FIG. 4 is a flowchart showing a program of operation of the failure-detecting device according to an embodiment of the invention.
Figure 4B:
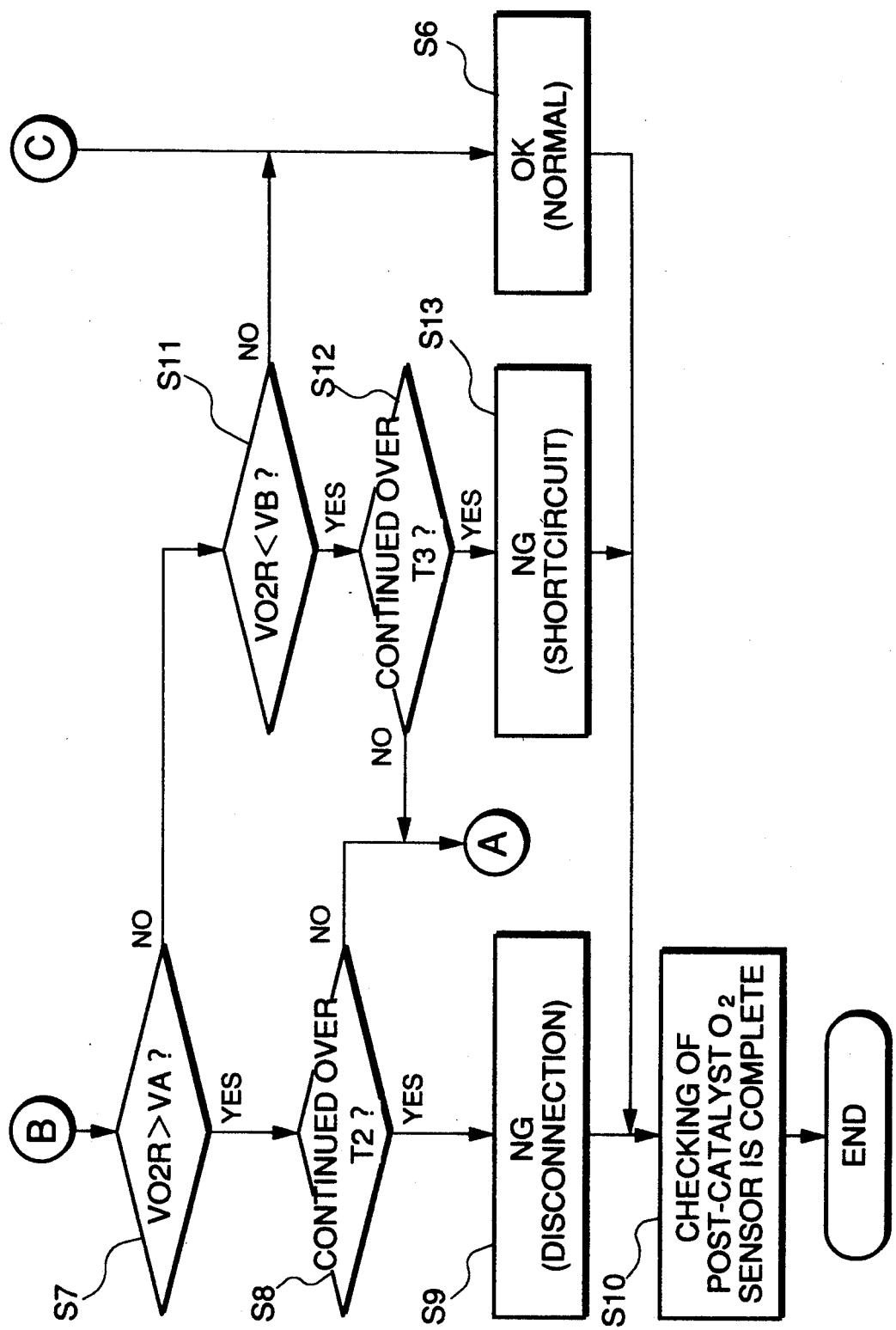

FIG. 3 shows a circuit arrangement of the $O_2$ sensor 16 and an $O_2$ sensor input circuitry within the ECU 5. As shown in the figure, one end of the $O_2$ sensor 16 is grounded to a wall of the exhaust pipe 13, and the other end of same is connected to the ECU 5 via a signal line 18. Within the ECU 5, there are provided a low-pass filter comprised of a capacitor $C_1$ and a resistance $R_1$, an operational amplifier 51, and voltage-dividing resistances $R_2$ and $R_3$. The output voltage VO2R from the $O_2$ sensor 16 is applied to a non-inverting input terminal of the operational amplifier 51 via the low-pass filter, amplified by the amplifier 51, and supplied to a multiplexer and an A/D converter, neither of which is shown, within the ECU FIG. 4 shows a program for detecting failure of the $O_2$ sensor, which is carried out by the failure-detecting device according to the embodiment of the invention. This program is executed whenever a predetermined time period (e.g. 40 msec.) elapses, i.e. a predetermined clock pulse is supplied from a timer, not shown. First, it is determined at a step S1 whether or not a predetermined time period T1 (e.g. 10 seconds) has elapsed after the ignition switch of the engine 1 was closed. If the answer to this question is negative (No), i.e. if the predetermined time period T1 has not elapsed after closing of the ignition switch, the present program is immediately terminated without checking failure of the $O_2$ sensor 16 (step S2). If the answer to the question of the step S1 is affirmative (Yes), i.e. if the predetermined time period T1 has elapsed after closing of the ignition switch, the program proceeds to a step S3, where it is determined whether or not perturbation of the air-fuel ratio of the air-fuel mixture is being carried out. The perturbation is carried out by alternately reversing the air-fuel ratio correction coefficient $KO_2$ such that it alternately assumes values higher and lower than an average value thereof by a predetermined amplitude (degree) (e.g. ±4 to 10%) at predetermined time intervals (predetermined repetition period) of e.g. 0.5 seconds.

(a) of FIG. 5 shows changes in the correction coefficient $KO_2$ during perturbation. The perturbation causes the air-fuel mixture having a regularly-changing air-fuel ratio to be supplied to the engine, and correspondingly the engine emits exhaust gases having a constantly-changing oxygen concentration, which is detected by the $O_2$ sensor 16.

If the answer to the question of the step S3 is negative (No), i.e. if it is determined that the perturbation is not being carried out, the present program is also immediately terminated without checking failure of the $O_2$ sensor 16 (step S2). If the answer to the question of the step S3 is affirmative (Yes), i.e. if it is determined that the perturbation is being carried out, the difference $\Delta VO2R$ between a present value $VO2R_n$ and an immediately preceding value $VO2R_{n-1}$ of the $O_2$ sensor output voltage is calculated at a step S4, and then it is determined at a step S5 whether or not the absolute value $|\Delta VO2R|$ of the difference $\Delta VO2R$ is equal to or less than a predetermined value $\Delta V$ (e.g. 0.1 V). If the answer to the question of the step S5 is negative (No), i.e. if $|\Delta VO2R| > \Delta V$, it is determined that the $O_2$ sensor 16 normally responds to perturbation of the air-fuel ratio of the mixture, and hence it is judged that the sensor 16 is normal (step S6). A characteristic curve Sa in (b) of FIG. 5 exemplifies such change of output voltage from a normal O2 sensor 16 as described above. In the present embodiment, as the predetermined time period within which an amount of change in the $O_2$ sensor output is to be detected, a time period between the present loop and an immediately preceding loop of the present program is employed. In other words, as described above, a value of the output voltage VO2R of the $O_2$ sensor 16 obtained in the present loop is compared with a value of same obtained in the immediately preceding loop. However, this is not limitative, but the difference between a value of the output voltage VO2R obtained in the present loop and a value of same obtained several loops preceding the present loop may be employed as the above predetermined time period.

If the answer to the question of the step S5 is affirmative (Yes), i.e. if $|\Delta VO2R| \leq \Delta V$, the program proceeds to a step S7, where it is determined whether or not the output voltage VO2R from the $O_2$ sensor 16 is above a predetermined reference voltage VA (e.g. 1.5 V). If the answer to this question is affirmative (Yes), i.e. if VO2R>VA, it is further determined at a step S8 whether or not the state of VO2R>VA has continued over a predetermined time period T2 (e.g. 3 seconds). If the state of VO2R>VA has not continued over the predetermined time period T2, the present program is immediately terminated. If the state of VO2R>VA has continued over the predetermined time period T2, it is determined at a step S9 that there is a disconnection in the $O_2$ sensor per se or its wiring, and checking of failure of the $O_2$ sensor is completed (step S10). The output voltage from such a faulty O2 sensor is indicated by a characteristic line Sb at (b) of FIG. 5, which exemplifies a case in which a voltage higher than the predetermined reference voltage VA (1.5 V) continues to be outputted from the operational amplifier 51 to which abnormally high voltage is supplied via the voltage-dividing resistances R2 and R3 from a voltage source Vcc, e.g. due to disconnection of the signal line 18. Further, the provision of the predetermined time period T2 contributes to accurate and positive detection of disconnection of the $O_2$ sensor or wiring thereof.

If the answer to the question of the step S7 is negative (No), i.e. if VO2R≤VA, the program proceeds to a step S11, where it is determined whether or not the output voltage VO2R from the $O_2$ sensor 16 is below a predetermined reference voltage VB (e.g. 0.1 V). If the answer to this question is negative (No), i.e. if VO2R≥VB, it is determined at a step S6 that the $O_2$ sensor is normal, whereas if the answer is affirmative (Yes), i.e. if VO2R<VB, it is further determined at a step S12 whether or not the state of VO2R<VB has continued over a predetermined time period T3 (e.g. 3 seconds). If the state of VO2R<VB has not continued over the predetermined time period T3, it is determined at a step S13 that the $O_2$ sensor per se or wiring thereof is short-circuited, completing checking of failure of the $O_2$ sensor 16 (step S10). The output voltage from such a faulty $O_2$ sensor is indicated by a characteristic line Sc at (b) of FIG. 5, which exemplifies a case in which a voltage lower than the predetermined reference voltage VB (0.1 V) continues to be outputted from the operational amplifier 51, e.g. due to the signal line 18 being short-circuited to the wall of the exhaust pipe 13, etc. Further, the predetermined time period T3 is likewise provided for prevention of an error in detection of a short circuit occurring with the $O_2$ sensor or wiring thereof.

Although in the above described embodiment, perturbation is effected by changing the air-fuel ratio correction coefficient $KO_2$, this is not limitative, but alternatively, means for supplying a secondary air into the exhaust pipe 13 may be provided, which can be controlled such that the amount of the secondary air is changed with a predetermined repetition period and by a predetermined amount (predetermined amplitude).

Further, another $O_2$ sensor may be provided upstream of the three-way catalyst 14 in the exhaust pipe 13, and the output from this $O_2$ sensor may be used for adjusting the central value of the coefficient $KO_2$ subjected to perturbation to thereby feedback-control the air-fuel ratio of the air-fuel mixture.

What is claimed is:

1. A failure-detecting device for an air-fuel ratio sensor of an internal combustion engine including an exhaust passage, and a three-way catalyst arranged in said exhaust passage, said air-fuel ratio sensor being arranged downstream of said three-way catalyst in said exhaust passage, said failure-detecting device comprising:
air-fuel ratio-perturbing means for changing the air-fuel ratio of an air-fuel mixture supplied to said engine with a predetermined repetition period and by a predetermined amplitude;
air-fuel ratio variation-detecting means for detecting an amount of change in an output from said air-fuel ratio sensor responsive to the air-fuel ratio of said air-fuel mixture perturbed by said air-fuel ratio-perturbing means; and
failure-detecting means for detecting failure of said air-fuel ratio sensor based on the amount of change in said output from said air-fuel ratio sensor detected by said air-fuel ratio variation-detecting means.

2. A failure-detecting device for an air-fuel ratio sensor according to claim 1, wherein said air-fuel ratio variation-detecting means detects the amount of change in said output from said air-fuel ratio sensor occurring within a predetermined time period.

3. A failure-detecting device for an air-fuel ratio sensor according to claim 2, wherein said failure-detecting means determines that there is a possibility that there is failure in said air-fuel ratio sensor when the detected amount of change in said output from said air-fuel ratio sensor is equal to or smaller than a predetermined value.

4. A failure-detecting device for an air-fuel ratio sensor according to claim 3, wherein said failure-detecting means includes sensor output-determining means for determining whether or not said output from said air-fuel ratio sensor falls within a predetermined range defined by predetermined upper and lower limit values, said failure-detecting means determining that there is failure in said air-fuel ratio sensor when the detected amount of change in said output from said air-fuel ratio sensor is equal to or smaller than said predetermfined value and at the same time said output from said air-fuel ratio sensor falls outside said predetermined range.

5. A failure-detecting device for an air-fuel ratio sensor according to claim 4, wherein said failure-detecting means determines that there is a disconnection in said air-fuel ratio sensor when said output from said air-fuel ratio sensor is higher than said predetermined upper limit value.

6. A failure-detecting device for an air-fuel ratio sensor according to claim 5, wherein said failure-detecting means finally determines that there is a disconnection in said air-fuel ratio sensor when said output from said air-fuel ratio sensor has continued to be higher than said predetermined upper limit value over a predetermined time period.

7. A failure-detecting device for an air-fuel ratio sensor according to claim 4, wherein said failure-detecting means determines that there is a short circuit in said air-fuel ratio sensor when said output from said air-fuel ratio sensor is lower than said predetermined lower limit value.

8. A failure-detecting device for an air-fuel ratio sensor according to claim 7, wherein said failure-detecting means finally determines that there is a short-circuit in said air-fuel ratio sensor when said output from said air-fuel ratio sensor has continued to be lower than said predetermined lower limit value over a predetermined time period.

9. A failure-detecting device for an air-fuel ratio sensor according to claim 1, wherein said air-fuel ratio perturbing means changes a value of an air-fuel ratio correction value for correcting an amount of fuel supplied to said engine.

* * * * *